May 14, 1968     J. JARRET ET AL     3,383,533
CONSTANT-FLUX VARIABLE-RELUCTANCE ELECTRIC MACHINE
Filed Oct. 18, 1965     3 Sheets-Sheet 3
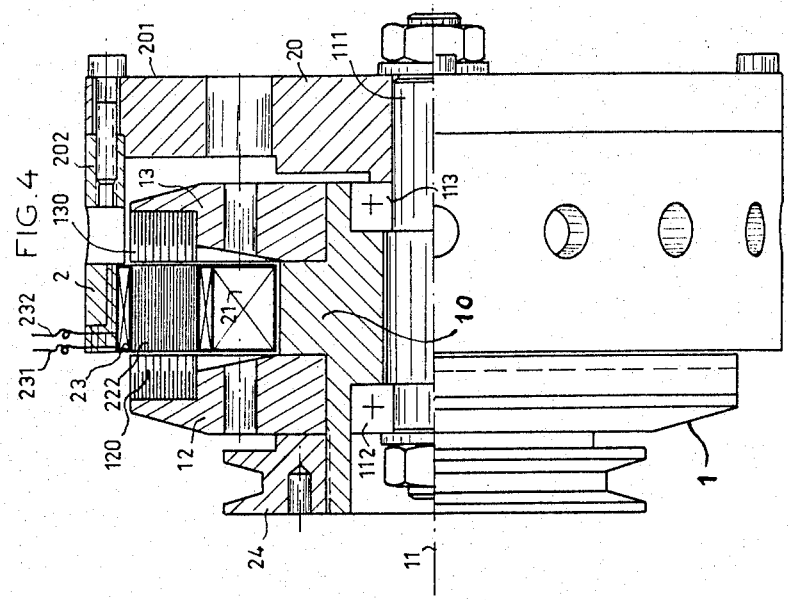
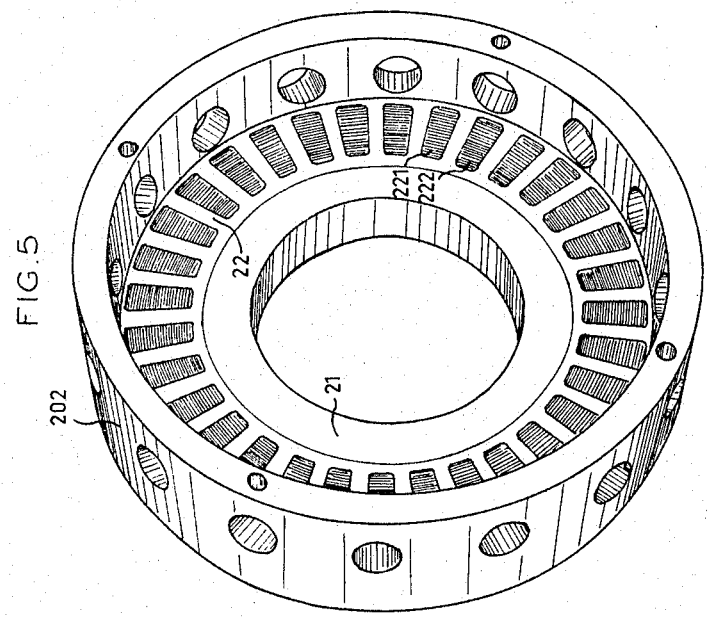
INVENTORS
JEAN JARRET & JACQUES JARRET
BY
Abraham A. Saffitz
ATTORNEY

United States Patent Office 3,383,533
Patented May 14, 1968

3,383,533
CONSTANT-FLUX VARIABLE-RELUCTANCE
ELECTRIC MACHINE
Jean Jarret, La Champanelle, Chemin du Clos, Baron,
Fourqueux, Seine-et-Oise, France, and Jacques Jarret,
35 bis Ave. du Belloy, Le Vesinet, Seine-et-Oise, France
Filed Oct. 18, 1965, Ser. No. 497,016
Claims priority, application France, Oct. 20, 1964,
991,977
4 Claims. (Cl. 310—168)

ABSTRACT OF THE DISCLOSURE

A single phase embodiment of a variable-reluctance electric machine comprising a stator having an energizing winding coaxially surrounded by a ring of independent magnetic cores provided with induction windings connected in series in alternate opposite directions and having a rotor which includes a shaft carrying two ferromagnetic end-plates having teeth disposed on either side of and opposite the ring of magnetic elements, wherein the part of the magnetic circuit which experiences variations of flux in operation is substantially limited to said cores and teeth by the combination of the following features:

(a) the rotor teeth are embodied with a reduced proportion of ferromagnetic material so as to be completely saturated to the exclusion of the entire remainder of the machine, whereby the flux density in the air gap between the rotary and fixed magnetic elements is uniform around the periphery of the facing elements;

(b) each rotor tooth always covers complementary areas of two adjacent stator cores so that the variations in the covered areas of two consecutive stator magnetic elements are equal and opposite, whereby the algebraic sum of the flux variations in each tooth is zero.

---

This invention relates to variable-reluctance electric machines, wherein the flux is constant in most of the magnetic circuits.

A magnetic flux should of course be highly constant in most of the magnetic circuits of variable-reluctance electric machines, for two reasons—reducing eddy current losses without recourse to lamination and to increasing the dimensions of the magnetic circuits, and reducing the induction in the exciting or energizing windings of voltages which must be compensated for or which produce interfering currents.

Variable-reluctance machines are known wherein magnetic fluxes modulated locally for the conversion of useful power, the variations being out of phase with one another, are combined by appropriate geometric systems to form a single flux. As a rule, however, the same is not constant since the compensation of the variations in the modulated fluxes which are combined to form the single flux is inaccurate. For instance, in one known geometric arrangement, the stator of a variable-reluctance electric machine comprises, in coaxial relationship to the rotor shaft, an exciting or energizing winding surrounded by a ring of independent magnetic lamination packs, each carrying an output winding and the rotor shaft supports, in spaced relationship, two disc-like pole members having on their opposing surfaces a plurality of projecting teeth facing the ring of lamination packs so that the fluxes modulated in the lamination packs by the passage of the teeth are combined to form a single flux in the discs, a return path being provided by the rotor shaft. However, this single flux cannot be considered to be constant, for the variations in the modulated fluxes of which the single flux is the sum are caused by variations in the reluctance of the magnetic circuits due to the movement of the rotor and to variations in permeability, and by variations in the number of ampere-turns resulting from the voltages induced in the output windings and from the load on the machine; since these factors are uncontrolled, accurate compensation can never be provided simultaneously, between the various elements of the magnetic circuit of this machine, for the variations in reluctance of the ferromagnetic circuits, whatever the number of ampere-turns in the windings and the variation of the currents in the output windings, at any load, may be.

It is an object of the invention to provided variable-reluctance machines of a kind such that, in most of the magnetic circuit of the machine, the modulated fluxes are recombined to form a single flux of constant value, whatever the speed and load of the machine.

The Patent No. 3,062,979 which was granted to the present applicants on Nov. 6, 1962, disclosed means for limiting saturation to that part of the magnetic circuit which is disposed in the effective air gap—i.e., to the rotor teeth—residing in that the rotor teeth are made of magnetic material and non-magnetic material—i.e., by pure iron laminations separated by layers of air or of an insulating substance—so as to reduce the mean saturation inductance of the rotor teeth to a value of from 15 to 85% of the maximum induction chosen for the magnetic circuit of the machine. Consequently, and on the assumption that the fields used are such that the mean intrinsic induction of the pure iron is constant, the variation of flux caused by the variation of reluctance is in each stator pole exactly equal to the variation of the overlapping area between the stator pole and a tooth.

According to the invention, in a variable-reluctance electric machine comprising a stator ring of independent magnetic elements having induced windings, the ring being located between two rotating discs made of a ferromagnetic material and having teeth, the same are so devised as always to be saturated to the exclusion of the rest of the machine, the geometric arrangement of the stator magnetic elements and of the teeth being such that the total stator magnetic element area covered by the teeth is strictly constant and the induced windings are identical and flowed through by currents whose algebraic sum is zero.

In a variable-reluctance single-phase alternator according to a specific embodiment of the invention the teeth are of constant height, they have a proportion of magnetic material of from 0.4 to 0.8, their number is equal to half the number of stator magnetic elements, and each tooth covers, in any position, a stator magnetic element area equal to the cross-section of a single stator magnetic element, so that variations in the covered areas of any two consecutive stator magnetic elements are equal and opposite, and since the teeth are always saturated, flux variations caused by the teeth passing by two consecutive stator magnetic elements are independent of the number of ampere-turns and are compensated for accurately; the windings of any two consecutive stator magnetic elements are connected in series with one another in a sense such that their ampere-turns are oppositely directed, so that flux variations due to variations in the number of ampere-turns are compensated for accurately at all loads in normal operating conditions in cases where the energizing ampere-turns are greater than the ampere-turns of the induced windings. Consequently, when the fluxes modulated in two consecutive stator magnetic elements are combined in the base of a tooth, they form a strictly constant flux at all speeds and loads of the machine.

Another object of the invention is to increase the mean torque of machines of the kind specified.

Another feature of the variable-reluctance machine according to the invention is that the teeth of each ring of the rotor are disposed inclinedly to the corresponding radii of the ring, so that the flux variations produced by their movement in two consecutive stator magnetic elements are continuous, equal to one another and oppositely directed.

Another object of the invention is to enable the rotor teeth to be embodied readily.

Another feature of the variable-reluctance machine according to the invention is that the teeth of each rotor end-plate are formed by a cylindrical shoulder of the end-plate being wound with a pair of ferromagnetic strips or tape or the like towards the stator magnetic elements and, another, the winding being such that the wider strip or tape or the like projects beyond the narrower strip or tape or the like towards the stater magnetic elements and, by suppression of the projecting part of the wider tape, into the gaps for separating the teeth from one another.

The invention will be more clearly understood from the following description and from the accompanying drawings wherein:

FIG. 4 is a diagrammatic view, partly in axial section, of an embodiment of a machine as shown in FIGS. 1–3, and FIG. 5 is a perspective view of the stator of the machine shown in FIG. 4.

Figure 1:
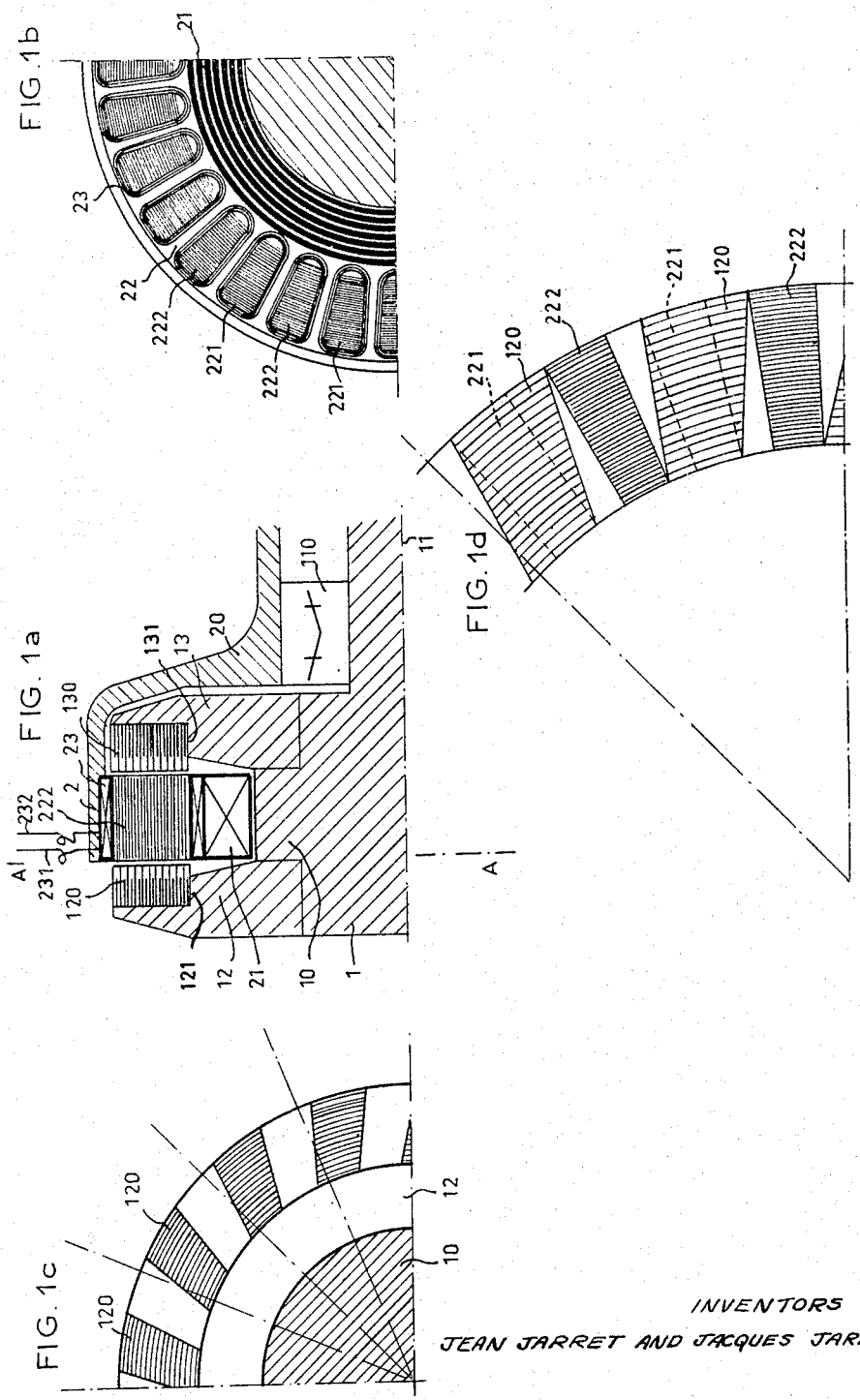
FIG. 1a is a diagrammatic view in half axial section of a machine according to the invention.
FIG. 1b is a half-section on the line A—A of FIG. 1a and looking from the left-hand side to show the arrangement of the stator.
FIG. 1c is a half-section along the line A—A of FIG. 1a but looking from the right-hand side to show the arrangement of the rotor teeth.
FIG. 1d is a diagram showing in axial projection the arrangement of the rotor teeth relatively to the stator magnetic elements in one particular position.

The machine diagrammatically illustrated in FIGS. 1a, 1b and 1c comprises a rotor 1 having a central core 10 which is a body of revolution around axis 11 of the machine and which is, for instance, fitted to the end of a shaft. The core 10 has two rotor end-plates 12, 13 which are symmetrical of one another relatively to a plane perpendicular to the axis 11 and which have respective teeth 120, 130 projecting towards the latter plane and towards an annular stator 2 maintained coaxially of the machine, in a space bounded by the central core 10, end-plates 12, 13 and their teeth 120, 130, by a shell 20 which is secured to the machine frame (not shown) and in which the rotor 1 is retained coaxially by an appropriate ball-bearing 110.

The central core 10, which forms all or some of the rotor shaft, and the end-plates 12, 13 are made of a ferromagnetic metal, such as mild steel or pure iron or ferrocobalt. The teeth 120, 130 take the form of pure iron laminae so separated from one another by an insulating substance that the proportion of pure iron in the teeth volume extending beyond the surfaces opposite the end-plates is from 0.4 to 0.8. The teeth can be fashioned by cutting an annular recess in the peripheral portion of those surfaces of each end-plate which are facing one another, the bottom of the recess being disposed in a plane perpendicular to the machine axis 11, whereafter the resulting cylindrical shoulder, as 121 or 131, is wound with a pair of tapes or strips or the like, the first of which is, for instance, made of silicon steel and has a width equal to the depth of the recess cut in the end-plate—i.e., equal to the length of the shoulder 121 or 131—while the second such tape or strip or the like is made of pure iron and is wider than the first tape or strip or the like.

The teeth are then machined in the projecting part of the strip of pure iron, preferably after impregnation with an insulating substance, such as Araldite. The gaps which separate the teeth and from which the projecting portion of pure-iron strip is removed during machining has the same superficial area as the teeth. The edges of each tooth are perpendicular to the plane of the end-plate from which they extend, and are inclined relatively to the corresponding radii in order to provide operating conditions which will be considered hereinafter.

When the teeth are opposite the stator magnetic elements, they are always saturated while the machine is in operation; preferably, their height, which takes up most of the effective air gap between the end-plates and the stator magnetic elements, is from 50 to 20% of the mean width of such a magnetic element.

The annular stator 2 is wound with a D.C. energizing winding 21 disposed at a very reduced distance from the central core 10 between the toothless parts of those surfaces of the end-plates 12, 13 which are opposite one another. The stator 2 also includes a ring 22 surrounding the winding 21 and comprising an even number of substantially trapezoidal stator magnetic elements whose axes extend radially; each such element is wound with an A.C. winding 23 whose axis extends parallel to the machine axis.

The winding 21 is embodied by turns of insulated copper wire, and its cross-section in a plane passing through the axis of the central core is substantially rectangular. The D.C. flowing through the winding 21 is of a strength such that the number of ampere-turns produces a high mean field of, for instance, some 500 to 5000 oersted in in the effective air gaps between the end-plates and the stator magnetic elements. The flux produced by this D.C. in the central core is constant and its general direction is parallel to the core axis.

To simplify matters, the windings 23 will hereinafter be called induced windings or output windings whether the machine is being used as a motor or as an alternator. To distinguish odd and even stator magnetic elements, the consecutive magnetic elements of the ring 22 have the alternate references 221, 222. The windings 23 of the odd and even stator magnetic elements are wound in opposite senses, and the windings 23 of any pair of magnetic elements 221, 222 taken in a predetermined direction are connected in series with one another. The resulting serial windings of the pairs of magnetic elements can be connected in series or in parallel or in any appropriate combination.

Advantageously, the stator magnetic elements are lamination packs of silicon steel with the crystals oriented parallel to the machine axis, the laminations being thinner in proportion as the frequency and amplitude of the flux variations are greater. For a single-phase machine delivering or receiving a sinusoidal current, the cross-section of the magnetic elements 221, 222 is substantially equal to $$\frac{2}{\pi-2}=1.75$$

times the surface separating two consecutive magnetic elements.

Figure 2:
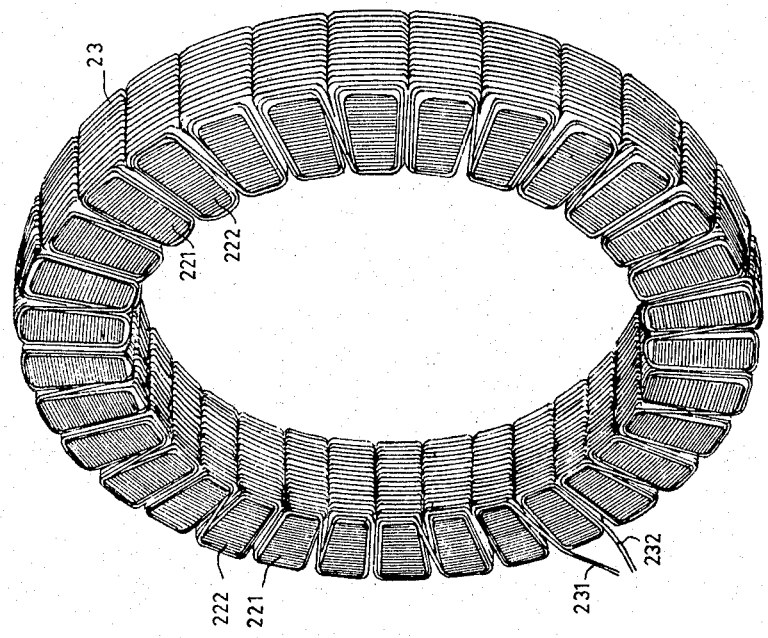
FIG. 2 is a perspective view of all the stator magnetic elements of a machine as shown in FIGS. 1a, 1b and 1c, the magnetic elements having their A.C. windings.

FIG. 2 shows a ring 22 containing 32 magnetic elements with all the induced windings 23 connected in series, the even-number magnetic elements 222 being wound oppositely to the odd-numbered magnetic elements 221, so that there are only two external connections 231, 232. The magnetic elements are disposed between those parts of the end-plates 12, 13 which have teeth 120, 130, at the same distance from the axis 11 as the latter teeth; also, the stator magnetic elements have the same radial dimension as the rotor teeth. As is normal practice, residual air gaps between the tooth ends and the two ends of the magnetic elements are very narrow.

Figure 3:
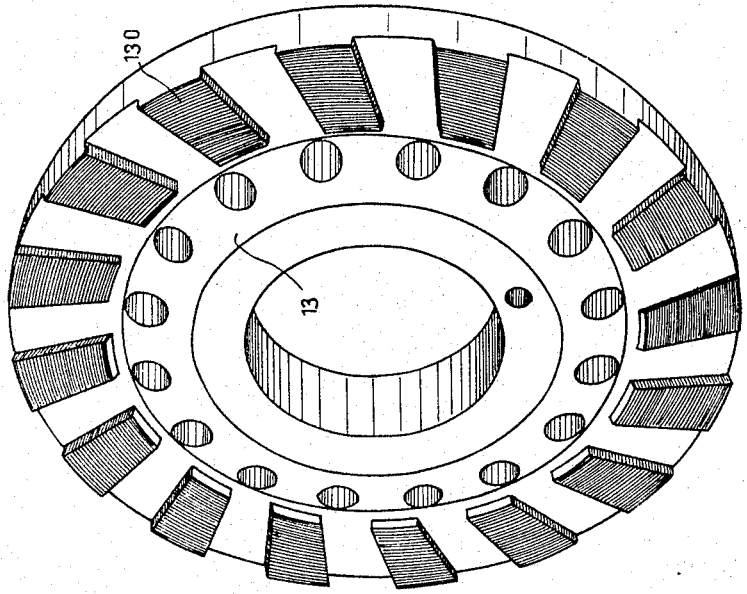
FIG. 3 is a perspective view of a rotor end-plate of a machine as shown in FIGS. 1a, 1b and 1c.

As FIG. 1c shows for the end-plate 12 and FIG. 3 for the symmetrical end-plate 13, each rotor end-plate has a number of teeth equal to half the number of stator magnetic elements—i.e., equal to the number of pairs of magnetic elements 221 and 222. The leading edge and the trailing edge of each tooth can be straight or curved, and their mean directions are inclined to the corresponding radial directions by an angle such that the flux variations produced in any two consecutive stator magnetic elements by their movement are continuous, equal to one another and oppositely directed. In other words, the shape of the teeth 120 is such that at each sixteenth of a rotor revolution each tooth can, as diagrammatically illustrated in FIG. 1d, fully cover a single magnetic element, e.g. 221, the magnetic elements 222 then being completely uncovered; any rotation of the rotor from this angular position causes an equal covering and uncovering of the respective magnetic elements 222 and 221 forming each pair. Consequently, the stator magnetic elements are flowed through by fluxes so modulated that their sum is, apart from leakage, constant and equal to the flux of the central core. The reason for this is that, since the sum of the flux variation in the induced windings is substantially zero, only the constant flux produced by the D.C. flowing through the winding 21 goes through the cylindrical core 10, and the return for this flux is by way of the end-plates, the teeth and the stator magnetic elements, with very reduced losses because the teeth of the two end-plates are disposed symmetrically of the central plane of the stator magnetic elements. Consequently, a modulated flux flows through the teeth and the end-plate parts near the same, whereas a constant flux goes through the other end-plate parts. Since there is no flux reversal anywhere in the machine, iron losses are very small. Also, and as already stated, the tooth edges can be straight or curved, so that the flux variations in the stator magnetic elements can follow desired laws, for instance, a sinusoidal law.

FIG. 4 shows a mechanical assembly of a machine as hereinbefore described and of use as an alternator. The machine is mounted on a fixed shaft 111 to which a support member 20 for the stator 2 is rigidly secured, the rotor 1 being mounted on the shaft 111 with the interposition of two ball-bearings 112, 113. The member 20 has a side plate 201 which is rigidly connected to the shaft 111 and perpendicular to the axis 11 thereof, and a cylindrical part 202 connected by screwed fasteners to the periphery of the side plate 201 and having at its other end the ring with the magnetic elements 22, the output windings 23 and the exciting or energizing winding 21. A driving pulley 24 is secured to the rotor 1 at the end opposite the end where the side plate 201 is connected.

FIG. 5 shows how the stator system of the machine shown in FIG. 4 is disposed, on the assumption that the side plate 201 has been removed from the support member 20. There can be seen more particularly the cylindrical portion 202 of the member 20 and the pancake or the like formed by the winding 21 and ring 22. The ends of the magnetic elements 221, 222 can be seen at the surface of the ring 22.

The invention has been described with reference to the example of a single-phase machine, but this example is not limitative and the invention covers transposition of the construction hereinbefore described to a three-phase machine. In such a case, the number of stator magnetic elements is divisible by three, the output windings of three consecutive stator magnetic elements are independent, and the number of teeth of each rotor end-plate is equal to one-third of the number of stator magnetic elements, any tooth constantly covering half the surface of three consecutive stator magnetic elements so that the flux variations therein are 120° out of phase with one another and the algebraic sum of the flux variations is zero, as is the sum of the currents in the output windings, provided that the loading on each of the three phases is the same.

We claim:

1. A variable-reluctance electric machine comprising a stator having a ring of independent magnetic elements provided with induction windings and an energizing winding surrounding the rotor shaft of the machine, a rotor including a shaft carrying two ferromagnetic end-plates having teeth disposed on either side of and opposite the ring of magnetic elements, said teeth being embodied with a proportion of ferromagnetic material less than in the remainder of the magnetic circuits of the machine so as to be completely saturated to the exclusion of the entire remainder of the machine; said stator magnetic elements and teeth being so disposed that the total area of stator magnetic elements covered by rotor teeth is strictly constant; and said induction windings being identical and so connected that current flows therethru, the ampere-turns of said windings having an elgebraic sum of zero whereby the part of the magnetic circuits of the machine which experiences variations of flux in operation is substantially limited to said stator magnetic elements and rotor teeth.

2. A constant-flux variable-reluctance single-phase alternator comprising a stator having a ring of independent magnetic elements provided with output windings and an energizing winding surrounding the rotor shaft of the machine, a rotor including a shaft carrying two ferromagnetic end-plates having teeth disposed on either side of and opposite said ring of magnetic elements, said teeth having a constant height and including a proportion of magnetic material of from 0.4 to 0.8 so as to be completely saturated to the exclusion of the entire remainder of said alternator; the number of said teeth on each rotor end-plate being equal to half the number of stator magnetic elements and each tooth permanently covering a stator magnetic element area equal to the cross-section of one stator magnetic element, so that the variations in the covered areas of two consecutive stator magnetic elements are equal and opposite, whereby flux variations due to the teeth passing by two consecutive stator magnetic elements are exactly compensated for, whatever the number of ampere-turns may be; and said output windings of two consecutive stator magnetic elements being connected in series with one another in a sense such that their ampere-turns are oppositely directed, whereby flux variations due to ampere-turn variations are exactly compensated for, whatever the load may be.

3. A variable-reluctance electric machine according to claim 2, wherein the teeth on the rotor end-plates are disposed inclinedly relatively to the corresponding radii of the rotor end-plates, so that flux variations produced by their movement in two consecutive stator magnetic elements are continuous, equal to one another and oppositely directed.

4. A variable-reluctance electric machine according to claim 2, wherein each of said rotor end-plates is provided with a cylindrical shoulder and the teeth on each of the rotor end-plates are constituted by a pair of ferromagnetic strips of different natures and widths from one another wound together on said cylindrical shoulder, so that the wider strip extends beyond the narrower strip towards the stator magnetic elements, the projecting portion of the wider strip being notched for making the rotor teeth.

References Cited

UNITED STATES PATENTS

| | | | |
|---|---|---|---|
| 437,501 | 9/1890 | Mordey | 310—168 |
| 594,145 | 11/1897 | Steinmetz | 310—168 |
| 937,675 | 10/1909 | Colman | 310—168 |
| 1,184,805 | 5/1916 | Wright | 310—168 |
| 2,519,097 | 8/1950 | Allen | 310—168 |
| 3,304,450 | 2/1967 | Bosco et al. | 310—168 |

MILTON O. HIRSHFIELD, *Primary Examiner.*

L. L. SMITH, *Assistant Examiner.*